United States Patent
Haque et al.

(10) Patent No.: US 9,770,680 B2
(45) Date of Patent: Sep. 26, 2017

(54) VANED FILTERING ELEMENT

(75) Inventors: Ziaul Haque, Deep River (CA); David Bruce Rhodes, Deep River (CA); Michel Gaudet, Pembroke (CA)

(73) Assignee: ATOMIC ENERGY OF CANADA LIMITED, Mississauga, Ontario (CA)

( * ) Notice: Subject to any disclaimer, the term of this patent is extended or adjusted under 35 U.S.C. 154(b) by 0 days.

(21) Appl. No.: 13/379,915

(22) PCT Filed: Feb. 26, 2010

(86) PCT No.: PCT/CA2010/000250
§ 371 (c)(1),
(2), (4) Date: Jul. 20, 2012

(87) PCT Pub. No.: WO2010/148477
PCT Pub. Date: Dec. 29, 2010

(65) Prior Publication Data
US 2012/0273407 A1    Nov. 1, 2012

Related U.S. Application Data

(60) Provisional application No. 61/219,659, filed on Jun. 23, 2009.

(51) Int. Cl.
*B01D 29/07* (2006.01)
*B01D 29/52* (2006.01)
(Continued)

(52) U.S. Cl.
CPC ............. *B01D 29/07* (2013.01); *B01D 29/52* (2013.01); *G21C 13/02* (2013.01); *G21C 19/307* (2013.01); *G21D 1/04* (2013.01); *B01D 2201/127* (2013.01); *Y02E 30/40* (2013.01)

(58) Field of Classification Search
CPC ........ B01D 29/07; B01D 29/39; B01D 29/52; B01D 2201/12; B01D 2201/127;
(Continued)

(56) References Cited

U.S. PATENT DOCUMENTS 4,072,616 A    2/1978  Rohlig
4,728,422 A  *  3/1988  Bailey ........................... 210/314
(Continued)

FOREIGN PATENT DOCUMENTS

CN        2134617 Y      5/1993
CN     101102827 A       1/2008
(Continued)

OTHER PUBLICATIONS

International Search Report dated Jul. 27, 2010 from PCT/CA2010/000250.
(Continued)

*Primary Examiner* — Lucas Stelling
(74) *Attorney, Agent, or Firm* — Norton Rose Fulbright Canada LLP (57) ABSTRACT

The present invention relates to filters used to remove debris from water being sucked into a piping system. It has particular application for use in nuclear power plants, which, after a loss of coolant accident, must pump cooling water back into the reactor core from a collection sump. This water may contain various types of debris that must be removed before the water is sent back into the reactor cooling system. Filtering of the debris is realized with the component known as "strainers". There are restrictions on the space available for installing strainers. The vaned filtering element, for example a vaned fin, of the present invention is designed to reduce the space required for strainer installation by increasing strainer surface area per unit volume, while maximizing the quantity of debris that can be filtered from the water.

21 Claims, 13 Drawing Sheets

(51) Int. Cl.
G21C 13/02 (2006.01)
G21C 19/307 (2006.01)
G21D 1/04 (2006.01)

(58) Field of Classification Search
CPC ........ G21C 13/02; G21C 19/307; G21D 1/04; Y02E 30/40
USPC ....... 210/493.1, 486, 487, 498, 499, 500.25, 210/456, 457, 459, 331, 345–347, 416.1, 210/224–231
See application file for complete search history.

(56) References Cited

U.S. PATENT DOCUMENTS

| | | | |
|---|---|---|---|
| 4,963,258 A | | 10/1990 | Yagishita |
| 5,158,586 A | | 10/1992 | Layton |
| 5,759,398 A | | 6/1998 | Kielbowicz |
| 5,835,549 A | * | 11/1998 | Sibiga ............................ 376/313 |
| 6,186,337 B1 | * | 2/2001 | Adams et al. ................ 209/401 |
| 6,355,082 B1 | | 3/2002 | Ishibe |
| 2008/0156712 A1 | * | 7/2008 | Rhodes et al. ................ 210/137 |

FOREIGN PATENT DOCUMENTS

| | | |
|---|---|---|
| CN | 101102827 A | 1/2008 |
| CN | 201233084 Y | 5/2009 |
| WO | WO 2006/050606 A1 | 5/2006 |
| WO | WO 2006050606 A1 * | 5/2006 ............. B01D 35/28 |

OTHER PUBLICATIONS

Written Opinion of the International Searching Authority dated Jul. 27, 2010 from PCT /CA2010/000250.

English Abstract of CN 101102827, Jan. 2008.

Chinese Patent Office, First Office Action dated Jan. 6, 2014, issued in Chinese Patent Application No. 201080034643.8, and an English translation thereof.

European Patent Office, Search Report dated Dec. 13, 2013, issued in European Patent Application No. 10791085.3 (7 pages).

Ruedinger, V. et al.; High-Strength High-Efficiency Particulate Air Filters for Nuclear Applications Nuclear Technology, American Nuclear Society, Chicago, IL, US, vol. 92, No. 1, Oct. 1990.

English Abstract of CN 201233084, May 2009.

European Patent Office; Communication Pursuant to Article 94(3) EPC dated Dec. 3, 2014, issued in corresponding European No. 10791085.3; 6 pps.

Chinese Patent Office, Second Office Action dated Oct. 20, 2014, issued in corresponding Chinese No. 201080034643.8, and an English translation thereof.

Chinese Patent Office; Office Action with English Translation dated Jun. 3, 2015, issued in corresponding Chinese No. 201080034643.8; 9 pps.

Taiwanese Patent Office; Office Action dated Mar. 16, 2015, issued in corresponding Taiwan Patent Application No. 099117620 and an English Translation; 5 pps.

Korean Patent Office; Office Action dated Sep. 25, 2015, issued in corresponding Korean Patent Application No. 10-2012-7001791 and an English Translation; 7pps.

Chinese Patent Office; Office Action dated Jan. 26, 2016 issued in corresponding Chinese Application No. 201080034643.8 and an English Translation; 8 pages.

Korean Patent Office, Notice of Preliminary Rejection dated Jul. 27, 2016, issued in the corresponding Korean Patent Application No. 10-2012-7001791, and an English Translation thereof.

* cited by examiner

VANED FILTERING ELEMENT

FIELD OF THE INVENTION

The present invention pertains generally to the field of fluid recirculation systems incorporating suction strainers. More particularly, the present application pertains to strainers used to remove debris from water being sucked into a piping system, such as in nuclear power plants.

BACKGROUND

A critical function of Emergency Core Cooling Systems (ECCS) and other recirculation systems of nuclear power plants is to move fluids quickly and in large volumes to critical areas of the nuclear power plant in the event of accidents and emergencies. Integral to this critical function is the ability of strainers, filters, screens and other such devices associated with the systems to remove solids from the moving fluids while at the same time maintaining a sufficiently large volume of fluid flow.

Nuclear plants have various safety systems to ensure that the nuclear fuel in the reactor core remains cooled in all credible accident scenarios. One such scenario is a "loss of coolant accident," (LOCA) in which an external pipe is postulated to break, allowing a large amount of water to escape from the reactor cooling system. This water may dislodge solid debris from neighbouring pipes or other reactor structures. The water, along with some of the dislodged debris, will flow to the lowest parts of the reactor building into a sump. Plants are equipped with safety systems that pump water from the sump back into various reactor cooling systems. Strainers on the pump intakes ensure that any debris large enough to clog equipment in these systems is prevented from entering.

Depending on the type of debris, the first layer to deposit on the strainer may form a mat of fibers and collect finer particles, which would otherwise pass through the strainer, resulting in a thin layer of low porosity debris with high hydraulic resistance. This behaviour is referred to as the "thin-bed effect" where the head loss per unit thickness of debris is relatively high as compared to that of full (or thick-bed) debris formation where relatively high porosity debris allows the passage of flow with lower head losses. Thin-bed debris can cause head losses high enough to threaten the functionality of emergency core cooling system (ECCS) sump recirculation pumps. Thin-bed debris has occurred operationally at nuclear power plants and has been created during head-loss testing. One way of alleviating the thin-bend effect is to increase the surface area of ECCS strainers.

Strainers must have enough screen area that the debris layer on the strainer is not too thick to cause unacceptably high restriction to flow. Strainers must also be as small as possible to fit into the available space. Therefore compactness, i.e., accommodating the most screen area in the smallest volume, is important.

Conventional strainers in many nuclear plants are simple box-type devices that were mounted over the pump intakes. Newer more advanced strainers often have an irregular surface to increase the surface area. An example of an advanced strainer is Atomic Energy of Canada Limited's (AECL's) Finned Strainer®, which is described in International PCT publication number WO 06/50606. The Finned Strainer performs the filtering function through modular hollow fins attached to a header that directs the filtered water to pump intake. The Finned Strainer includes two different fin designs (1) Flat-Surface Fins and (2) Corrugated Surface Fins. These fins have porous filtering surfaces.

There remains a need for an improved strainer or filtering element, for example one that minimizes the thin-bed effect described above, and which can be incorporated into existing systems.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a vaned filtering element. The present invention is an improvement to the Flat-Surface Fin design with the addition of vanes that result in a more compact design. The large increase in filtration surface area over a Flat-Surface fin is a significant advantage to reduce the thin-bed effect. The increased area reduces the restriction to flow entering the strainer by decreasing the water velocity through the screen and reducing the thickness of debris (because it is spread over a larger area). The resistance of this thin layer to flow entering the strainer is reduced with the larger screen area achieved by the vanes.

In accordance with an aspect of the present invention, there is provided a vaned filter element comprising one or more fluid permeable screens formed from at least one layer of porous material that is folded into a plurality of hollow vanes extending outwardly from the outer surface of the each of the one or more fluid permeable screens.

In accordance with another aspect of the present invention, there is provided a filtering element comprising: a perimeter frame having one or more openings along one side edge of said frame, a pair of fluid permeable screens fixed to the perimeter frame in opposed spaced relation to one another, and at least one fluid flow channel is formed between the fluid permeable screens for fluid communication with a header or tube via the one or more openings in the side edge of said frame, wherein each of said fluid permeable screens is formed from one or more perforated metal sheet, metal mesh or a combination thereof, and includes folds to form a plurality of outwardly extending hollow vanes.

In accordance with another aspect of the invention, there is provided a strainer for filtering debris from a fluid comprising: (a) a header defining an enclosed volume and having an outlet in fluid communication with a suction source, said header having a plurality of inlet aperture slots formed therein, and (b) fin-like filter elements projecting outwardly from each aperture slot for filtering debris from said fluid, each said filter element comprising a perimeter frame and a pair of fluid permeable screens fixed thereto in opposed spaced relation, and at least one fluid flow channel therebetween in fluid communication with said enclosed volume through a marginal side edge of said frame and said aperture slot, wherein each of said fluid permeable screens is formed from one or more perforated metal sheet, metal mesh or a combination thereof, and includes folds to form a plurality of outwardly extending hollow vanes.

DETAILED DESCRIPTION OF THE INVENTION

Definitions

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

Briefly described, the present invention provides a vaned filter element comprising one or more fluid permeable screens formed from at least one layer of porous material that is folded into a plurality of hollow vanes extending outwardly from the outer surface of the each of the one or more fluid permeable screens. The vaned filtering element of the present invention is designed to reduce the space required for strainer installation by increasing strainer surface area per unit volume, while maximizing the quantity of debris that can be filtered from the water.

In a specific embodiment, the vaned filter element comprises two layers of porous material that are in the form of two fluid permeable screens in opposed spaced relation to one another. This vaned filter element has at least one fluid flow channel formed between the two fluid permeable screens. In this embodiment, the vaned filter element is referred to as a "fin". The incorporation of the outwardly extending vanes in the fluid permeable screens of fins increases the filtering surface area of the fins in comparison to a similarly dimensioned Flat-Surface or Corrugated Surface fin and permits the use of small filter holes while minimizing the thin bed effect.

Figure 11:
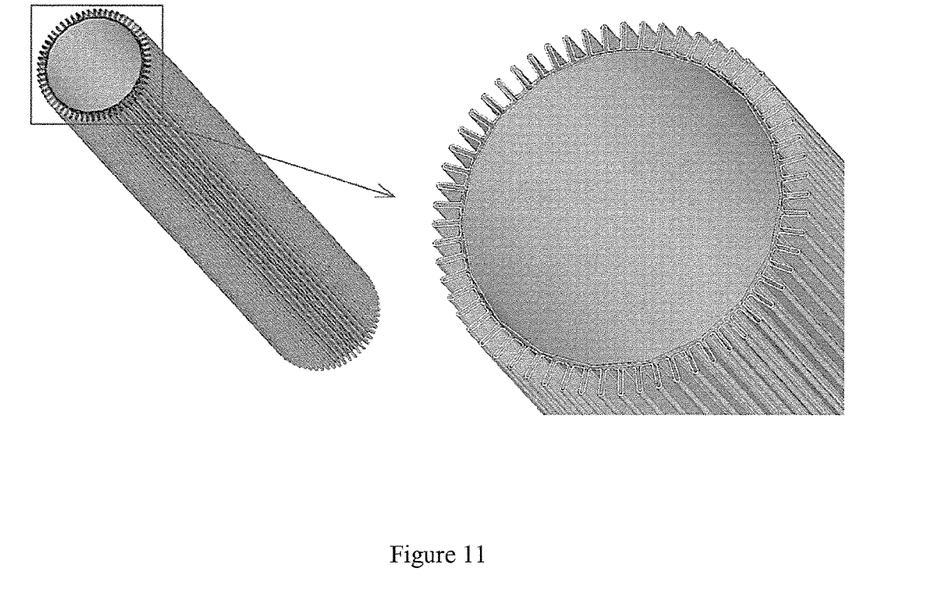
FIG. 11 depicts a cylindrical vaned fin according to one embodiment of the present invention.
Figure 12:
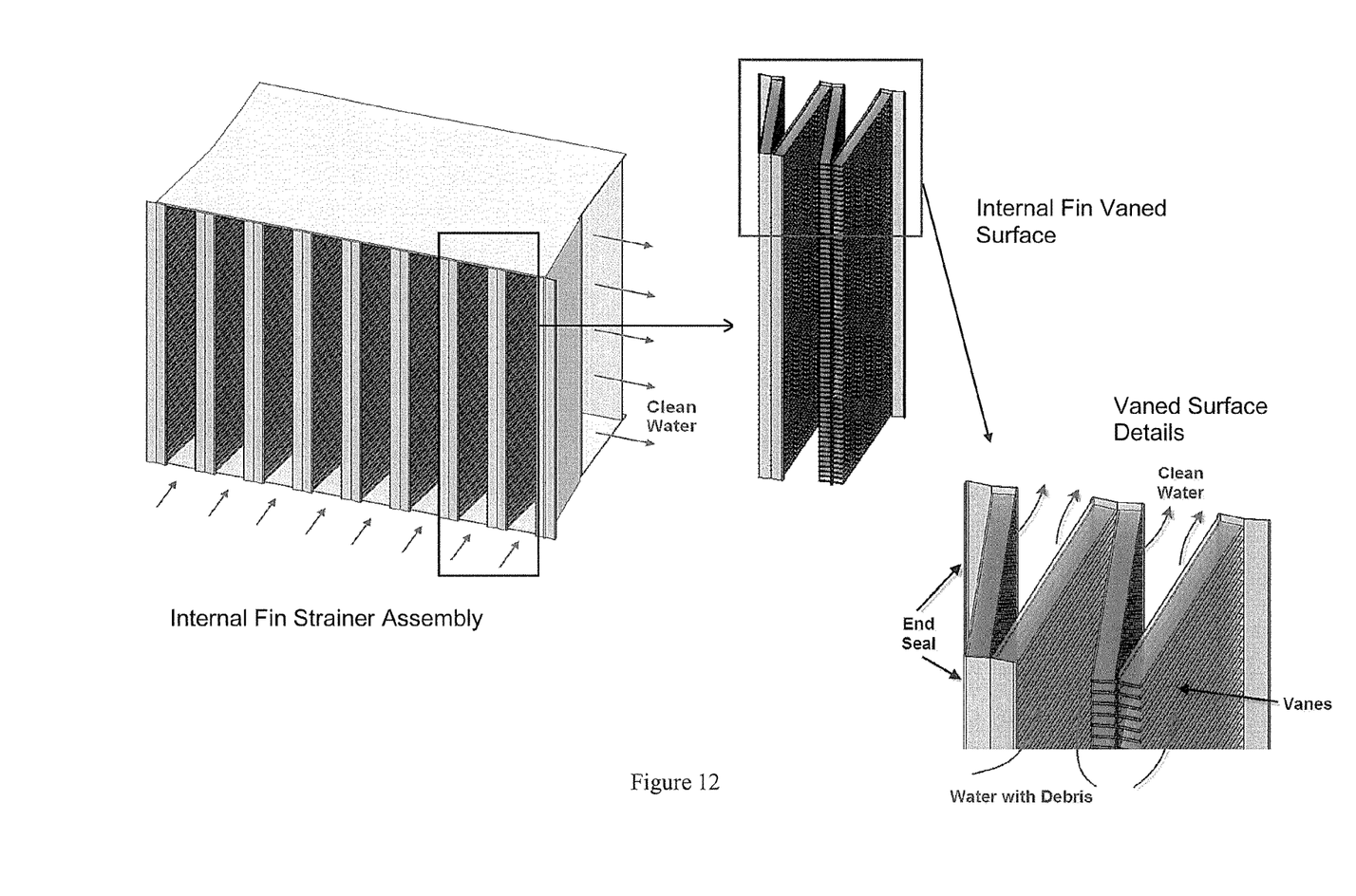
FIG. 12 depicts a vaned internal-fin filter element according to one embodiment of the present invention.
Figure 13:
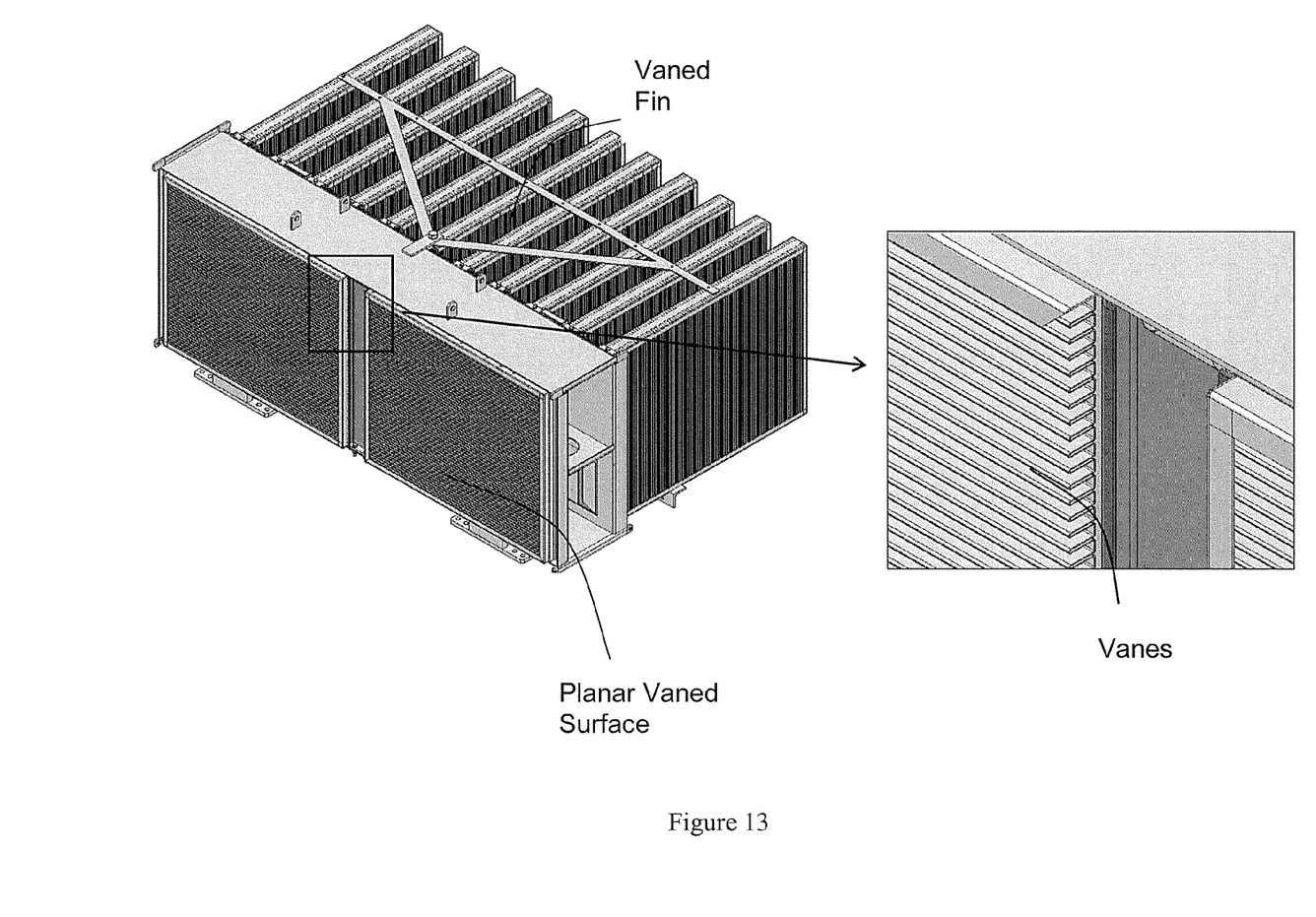
FIG. 13 depicts a planar vaned filter element according to one embodiment of the present invention.

In an alternative embodiment, the vaned filter element is configured as a cylinder having outwardly projecting vanes formed (see, for example, FIG. 11). In another embodiment, the vaned filter element is configured such that the vanes are inwardly projecting; this configuration is referred to as a vaned internal-fin filter element (see, for example, FIG. 12). In another embodiment, the vaned filter element is planar, such that the vanes extend outwardly from one side of the filter element (see, for example, FIG. 13). The selection of the appropriate filter element will depend on the ultimate application.

The present invention further provides a strainer system that includes one or more vaned filter elements.

The following description is based on vaned filter elements that are configured as fins. However, it is understood that this description is not intended to limit the invention to vaned filter elements having a fin configuration.

Figure 1:
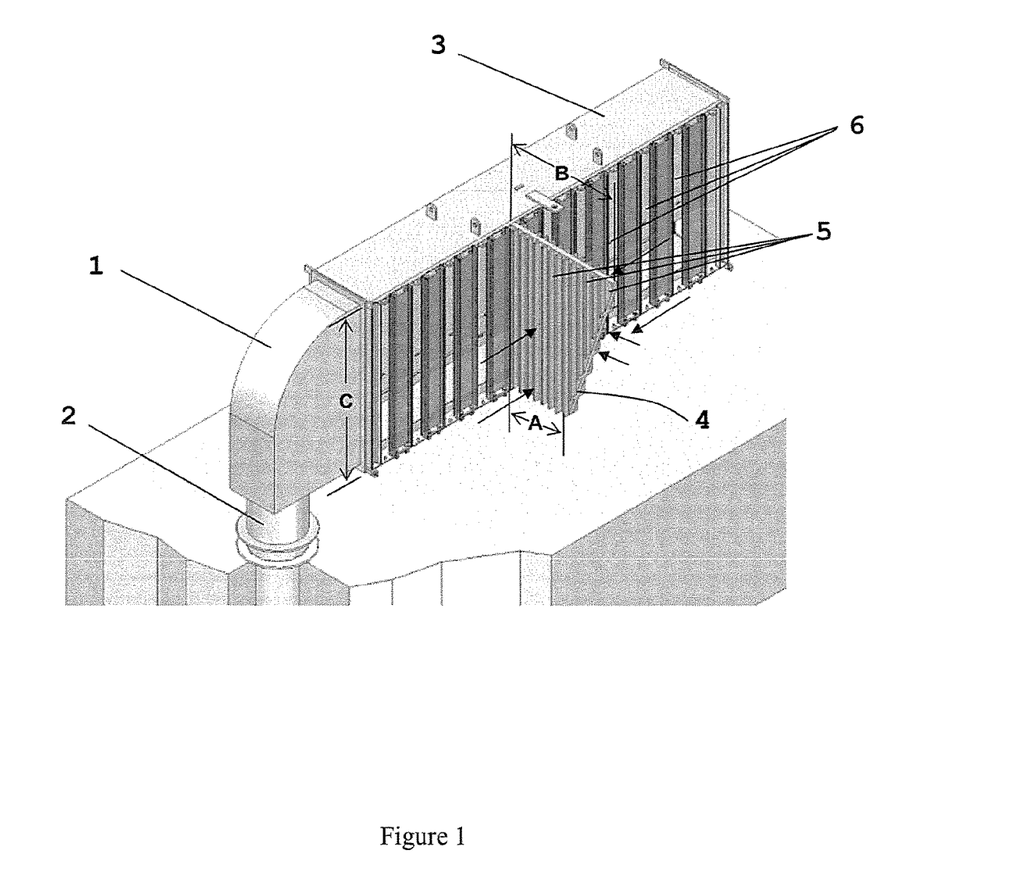
FIG. 1 depicts a vaned filter element (fin), according to one embodiment of the present invention, connected to a header (Isometric).

Referring now to the drawings, in which like reference characters indicate like parts throughout the several views, FIG. 1 depicts a vaned filter element as a component of a strainer system according to one embodiment of the present invention. The strainer system depicted in FIG. 1 includes four major components: one or more connection(s) 1 to the pump intake pipe 2; a duct, termed header 3, that collects incoming fluid and directs it to the pump intake, which may be in the floor or on a wall; and vaned filter element 4 with porous and hollow vanes 5. Although the system depicted in FIG. 1 includes only a single vaned filtering element 4, header 3 includes a plurality of slots 6 to accommodate multiple vaned filtering elements, or fins, and to allow the passage of fluid from each of the fins to the header.

The vaned filter element, or fin, of the present invention can be designed as a modular attachment to larger structures that are connected to the pump intake, such as ducts and headers. As an alternate arrangement, the vaned filter element can be installed directly to an existing sump where the pump intake 2 is connected. Depending on the amount of debris, composition of debris, flow rate and pump suction head availability, additional fins are added in a modular manner to form a strainer system.

The vaned filter element design incorporates spatial flexibility by customizing dimensions A, B and C of each fin as shown in FIG. 1. This flexibility ensures that the available space, for example, in existing nuclear reactors, is used optimally and the strainer system can be built around existing structures.

Figure 2:
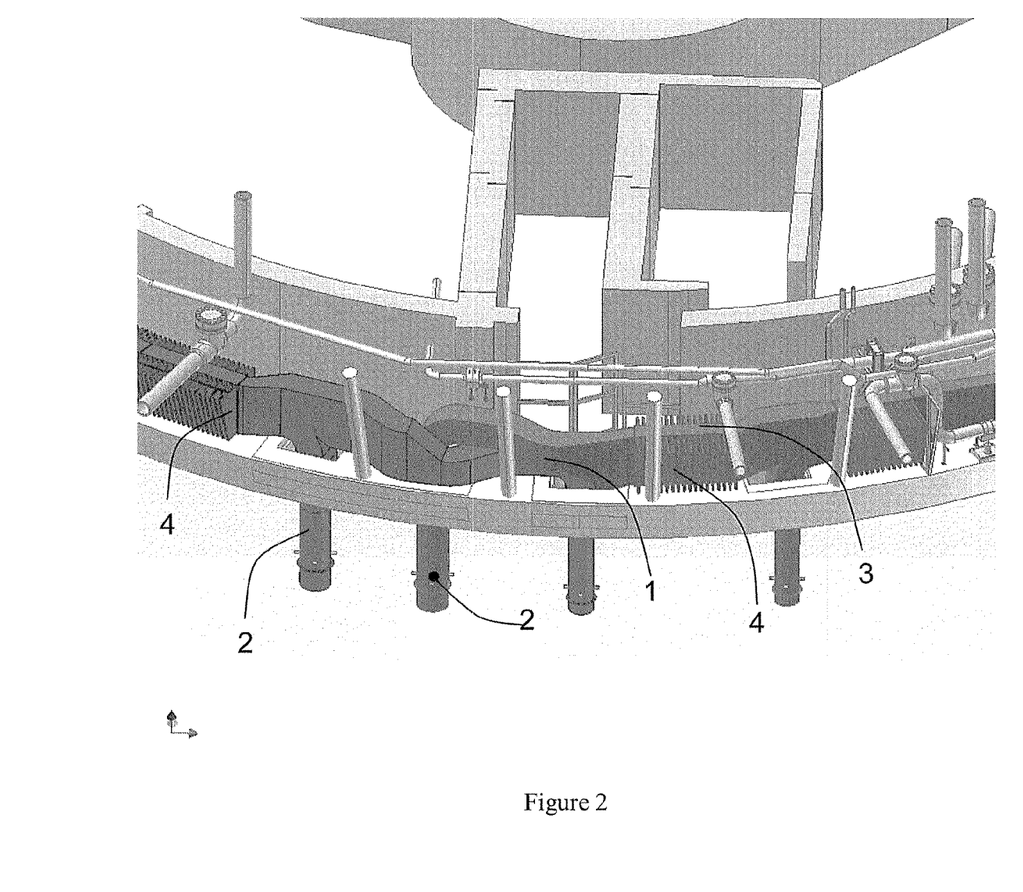
FIG. 2 depicts a modular use of a vaned filter element (fin) in a strainer assembly, according to one embodiment of the present invention.

An example of a modular use of the vaned filter element in a strainer system is shown in FIG. 2. FIG. 2 depicts only part of a strainer assembly that includes multiple headers 3 that are connected to corresponding connections 1 to corresponding pump intake pipes 2. Each header 3 collects incoming fluid and directs it to the corresponding pump intake pipe 2. Further, as depicted in FIG. 2, each header 3 includes a plurality of vaned filtering elements 4.

Fins can be mounted on one side (as shown in FIG. 1), two sides (as shown in FIG. 2) top, bottom, or a combination of sides, top and/or bottom of the header. Fins can have differing dimensions, and uniform or variable spacing, depending on the particular spatial and filtering requirements of the application.

When designing a strainer system that includes a number of vaned fins or filtering elements, it is necessary to optimize the design for the type and quantity of debris that the strainer needs to be able to handle. Two basic factors need to be considered: the filtration area required, and the potential volume of debris that must be accommodated within the strainer. Simplistically, the number of vaned fins is determined by the required filtration area, and then fin spacing can be varied to ensure that there is sufficient space between fins for the postulated debris volume.

To prevent air ingestion, it is simplest to ensure that there is sufficient height of water above the fin; however, another option is to design the header such that the flow passage is always submerged. This prevents air ingestion provided (simplistically) that the submergence of the entrance to the header exceeds the head loss across the screen and debris. Another option is to add a horizontal cover over the fins. This cover allows the fins to be closer to the water surface without ingesting air or causing hollow-core vortices.

The vaned filter element, or fin, of the present invention is a variation of the Flat Surface Fin of the Finned Strainer technology described in International PCT publication number WO 06/50606. Two configurations of the vaned filter element of the present invention are detailed in the next sections.

Figure 3:
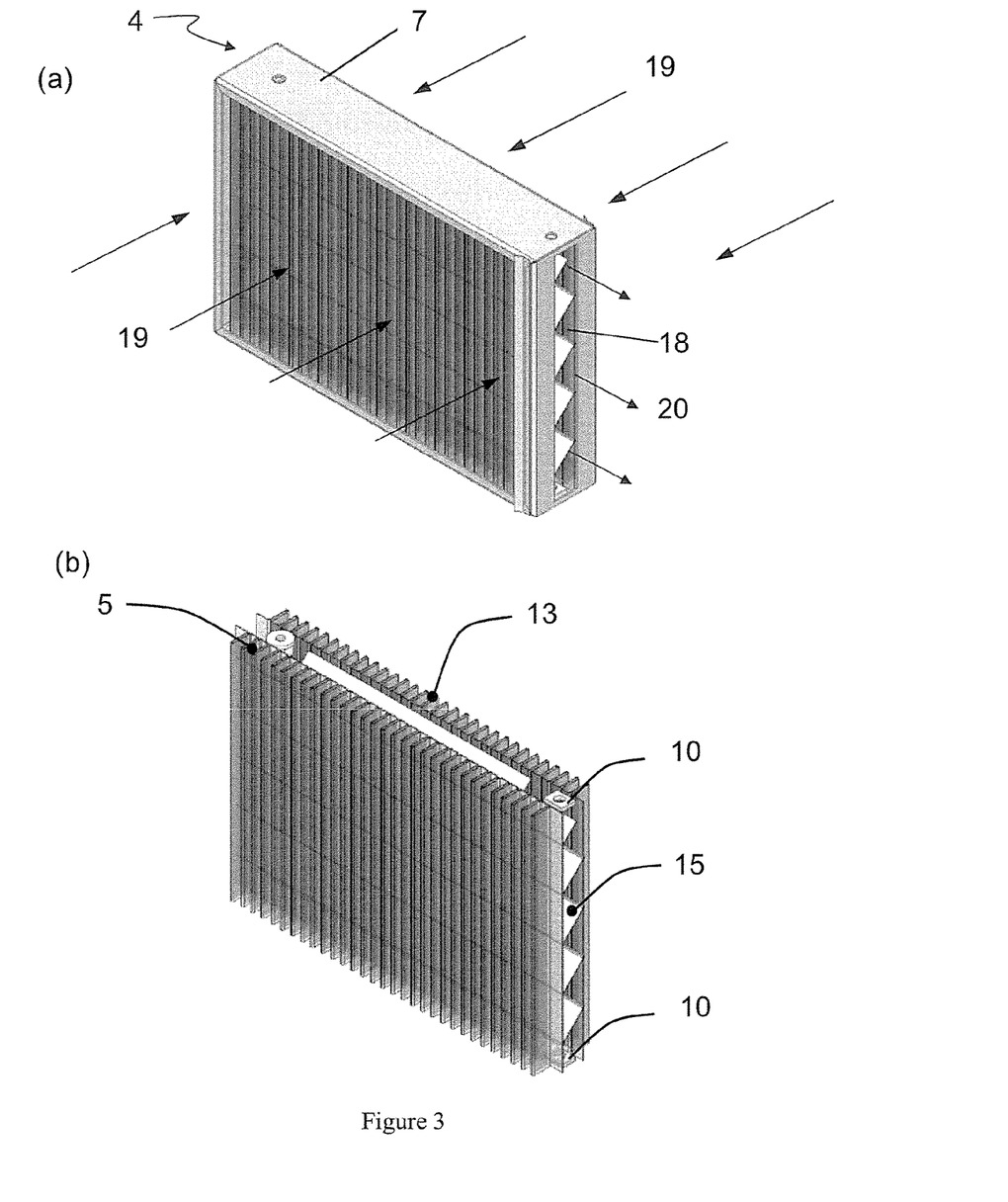
FIG. 3 depicts a vaned fin according to one embodiment of the present invention, in which the fluid permeable screens are formed with perforated metal vanes. The vaned fin is depicted with the outer frame (a), and outer the mounting frame (b).

FIGS. 3(a) and (b) depicts a vaned filtering element, or fin, 4 according to one embodiment of the present invention, in which the vaned fin 4 is easily installed or removed using one or more connection means, such as a pin and a bolt inserted in opening 10. Alternatively, the vaned filtering element of the present invention can be permanently attached to a header to so as to form a permanent component of a strainer system (not shown).

Figure 5:
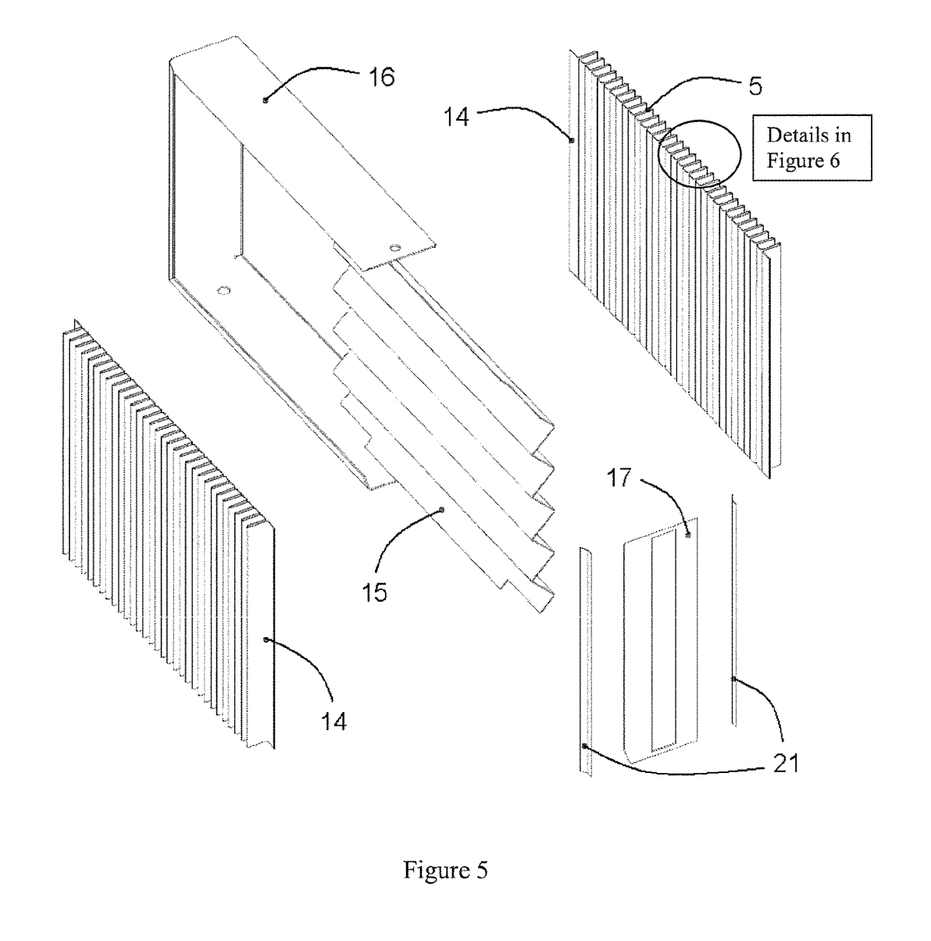
FIG. 5 is an exploded view of the vaned fin shown in FIG. 3.
Figure 6:
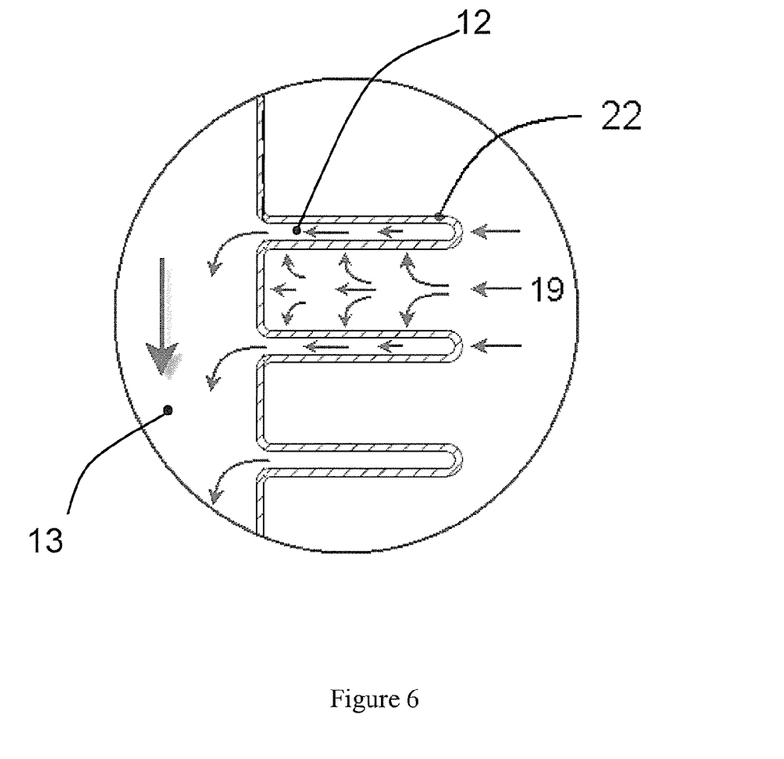
FIG. 6 is a detail view of hollow vanes of the vaned fin shown in FIG. 3.

As shown in FIG. 3(a), water enters the fin 4 (shown as inflow 19) through a porous filtration screen, leaving debris on the screen, and exits fin 4 through side opening 18 (shown as outflow 20). In FIG. 3(b) the structure of the porous filtration surface of fin 4 is shown to include a filtration surface formed in the shape of vanes 5, to increase the surface area. Two types of vanes can be used based on the design requirements:

1. Perforated Metal Vane: The vanes of the porous filtration screen are formed from a single perforated sheet metal (FIG. 5 and FIG. 6).

Figure 9:
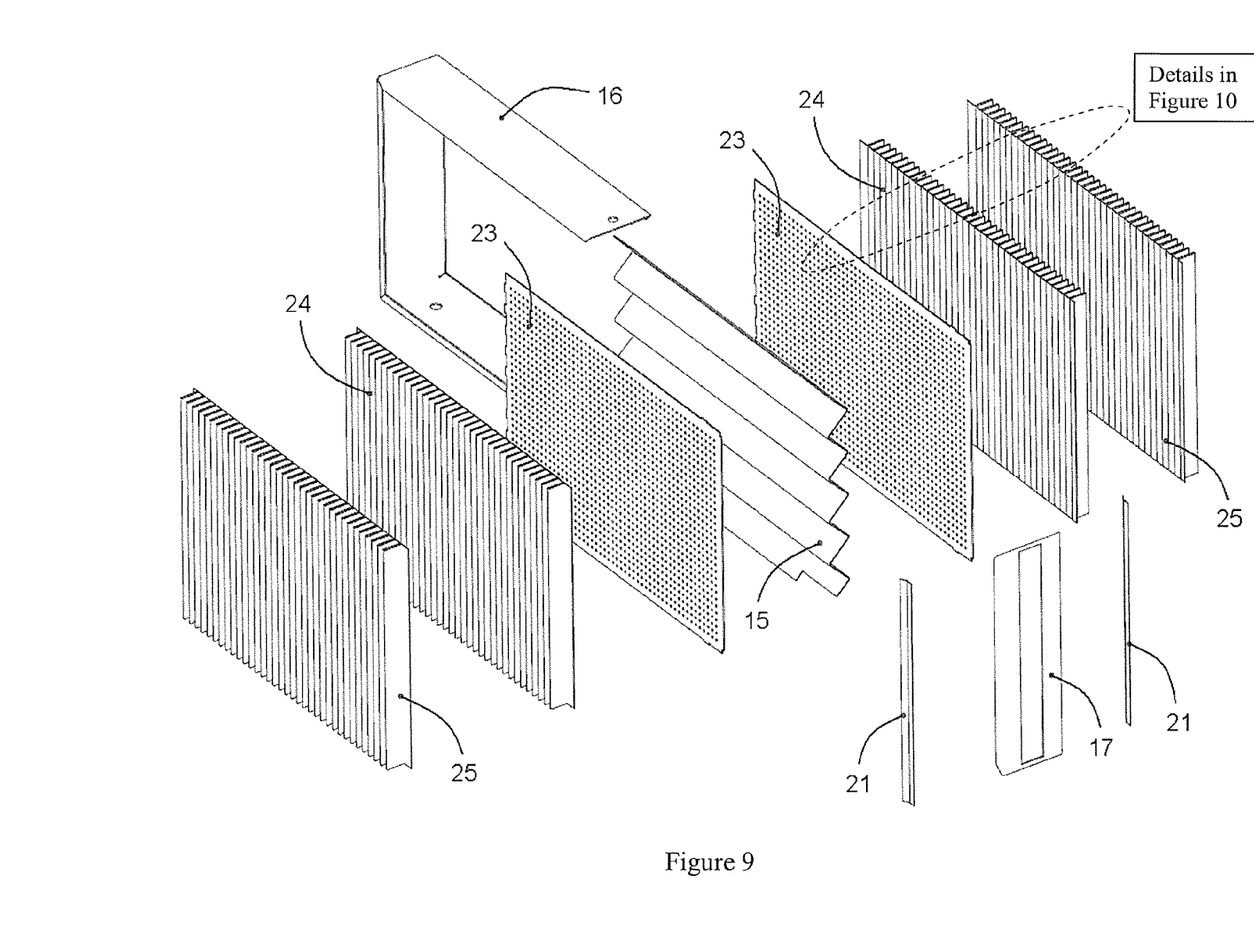
FIG. 9 is an exploded view of the vaned fin shown in FIG. 7.
Figure 10:
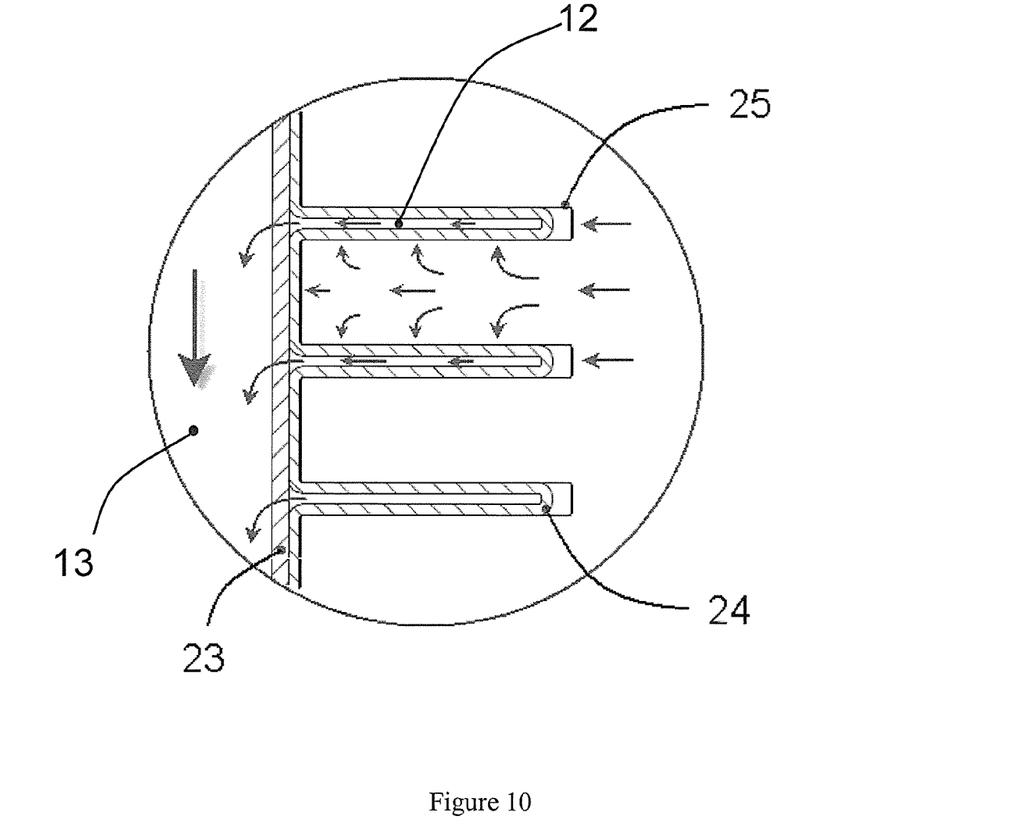
FIG. 10 is a detail view of hollow vanes of the vaned fin shown in FIG. 7.

2. Layered Metal Mesh Vane: If the application requires fine-particle filtering capability, an alternate porous filtration screen, composed of two layers of woven metal mesh, is used (FIG. 9 and FIG. 10).

These are described in more detail below.

FIG. 3(b) depicts the interior of a vaned fin 4, without an outer frame. However, in use and as depicted in FIG. 3(a), vaned fin 4, will include outer frame 7 in order to provide mechanical stability and to define part of the at least one fluid flow channel within the vaned fin 4. In some embodiments, the frame itself can include perforations or be formed from a rigid porous material to provide additional filtering. Alternatively, the frame can be made from a rigid material that is impermeable to fluid. In each case, however, the frame includes an elongated opening 18, or a series of smaller openings (not shown) along one side, which corresponds with a slot or opening in the header to which it is, or is to be, attached. It is through this opening that fluid flows from the main flow channel 13 within vaned fin 4, into the header.

Figure 4:
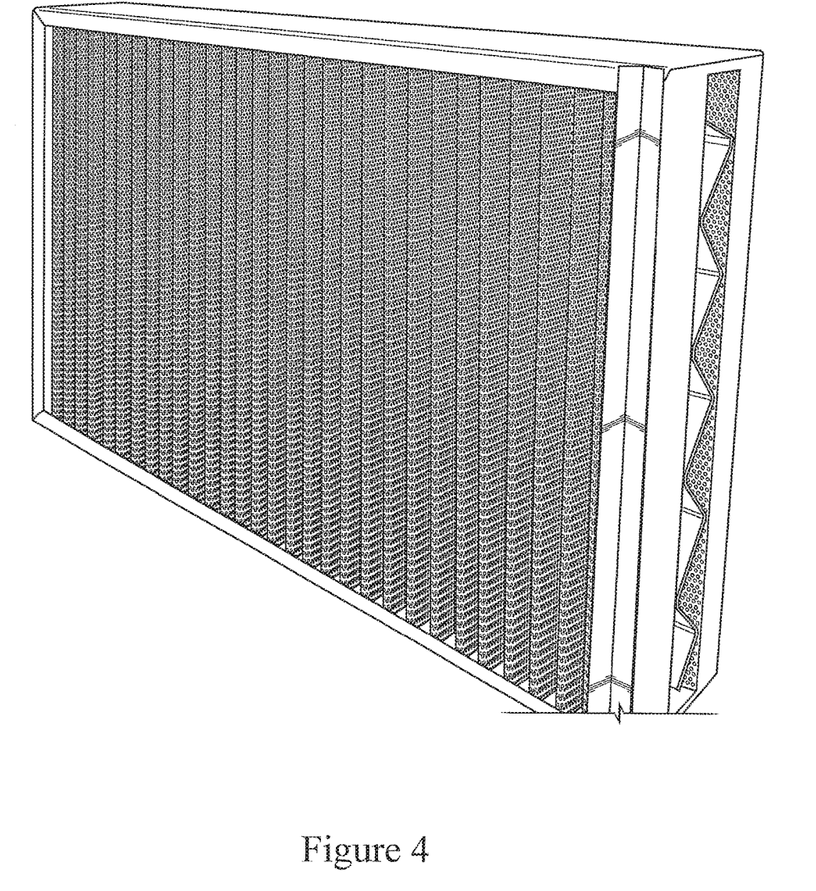
FIG. 4 is a photograph of a vaned fin according to one embodiment of the present invention, in which the fluid permeable screens are formed with perforated metal vanes.

FIG. 4 is a photograph of a vaned fin as depicted in FIG. 3(a), and which includes perforated metal vanes.

As depicted in FIG. 5 and FIG. 9, outer frame 7 of vaned fin 4 can include an end cap 17 at the header end of vaned fin 4. End cap 17 is formed from a plate that is welded over one end of corrugated plate 15. End cap 17 includes a large opening 18 through which flow exits fin 4 and enters the header. End cap is also attached to C-shaped mounting frame 16, which can be unitary or made up of separate plates, to form the overall outer frame 7.

The edges of the end cap are sealed into the collection header with flexible metal strips 21, which ensure a good fit of the fin into the header.

Perforated Metal Vanes

FIG. 5 shows an exploded view of vaned filter element 4 according to one embodiment of the present invention, which includes fluid permeable screens made from vaned perforated metal. In this configuration the porous vaned surfaces are formed from a single perforated metal plate. The perforated metal plate vane surface is simple to manufacture and adds significantly to the strength of the fin.

The two vaned surfaces 14 on each side of the fin are separated by a corrugated plate 15 that provides stiffness and strength, and forms flow channels for fluid communication with the collection header. Edges of the vaned fin are covered by a mounting frame 16 around all sides except the edge that fits into the header. This edge includes one or more openings to facilitate fluid communication between the flow channels and the interior of the header. This frame also adds to the structural strength of the fin. The mounting frame 16 can be fully or partially perforated if extra screen area is needed.

The details of the perforated metal vane are shown in FIG. 6. As illustrated in this figure, after entering the vanes, water flows through the hollow core 12 of the vanes towards the main flow channel 13 of the fin. With the optimal use of vane spacing, the thin-bed effect is minimized.

Layered Metal Mesh Vanes

If the application of the vaned filter element requires smaller filtration holes than are achievable using standard perforated metal plate, an alternative is to manufacture the vanes using woven metal mesh.

Figure 7:
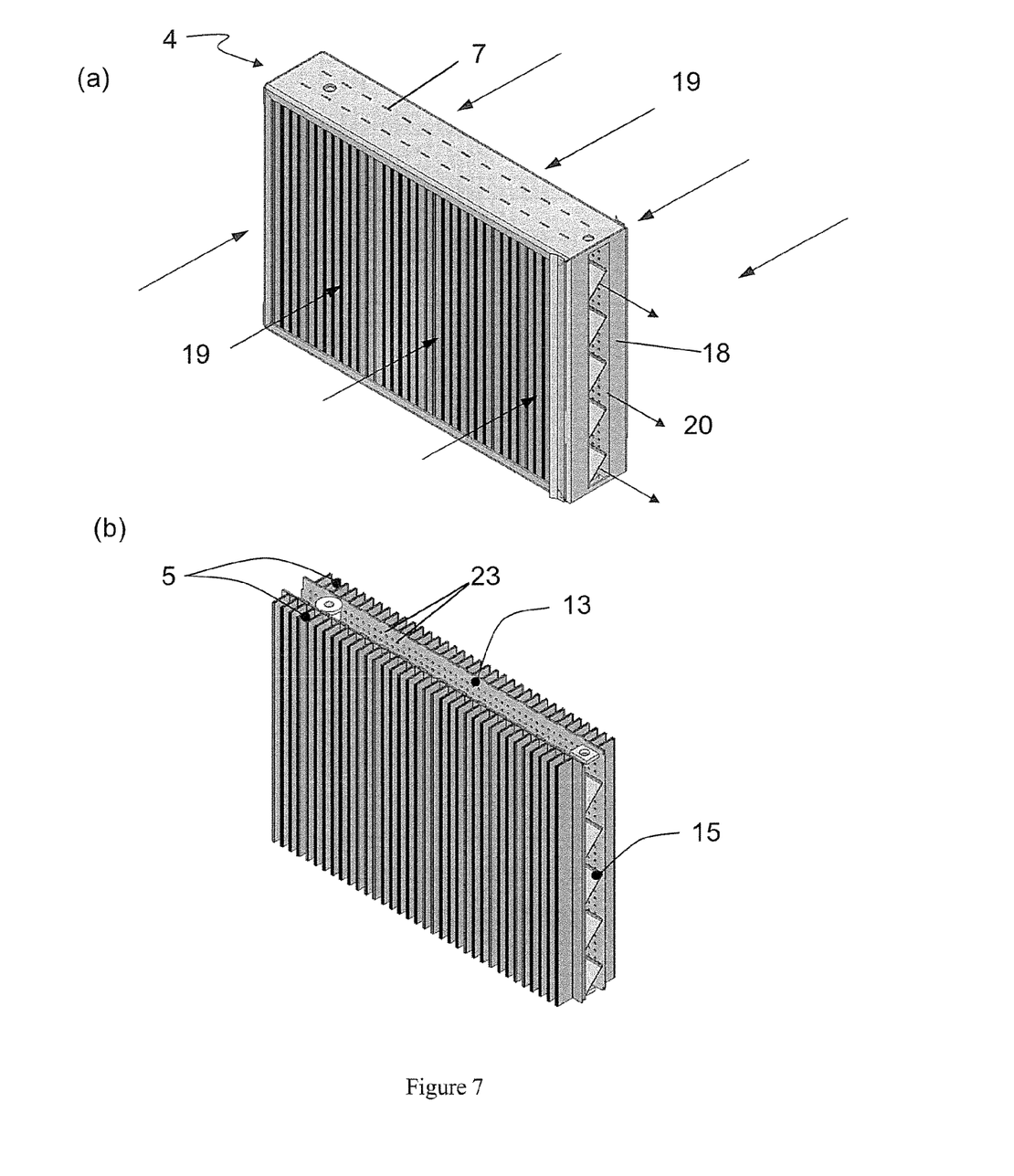
FIG. 7 depicts a vaned fin according to one embodiment of the present invention, in which the fluid permeable screens are formed with layered metal mesh vanes. The vaned fin is depicted with the outer frame (a), and without the outer frame (b).

As shown in FIG. 7(a), water enters the fin 4 (shown as inflow 19) through a porous filtration screen, leaving debris on the screen, and exits fin 4 through side opening 18 (shown as outflow 20). In FIG. 7(b) the structure of the porous filtration surface of fin 4 is shown to include a filtration surface formed in the shape of vanes 5, to increase the surface area. In the embodiment depicted in FIG. 7, the vaned surfaces are formed from a layered metal mesh. The two vaned surfaces are attached to the flat perforated plate 23.

FIG. 7(b) depicts the interior of a vaned fin 4, without an outer frame. However, in use and as depicted in FIG. 7(a), vaned fin 4, will include outer frame 7 in order to provide mechanical stability and to define part of the at least one fluid flow channel within the vaned fin 4. In some embodiments, the frame itself can include perforations or be formed from a rigid porous material to provide additional filtering. Alternatively, the frame can be made from a rigid material that is impermeable to fluid. In each case, however, the frame includes an elongated opening 18, or a series of smaller openings (not shown) along one side, which corresponds with a slot or opening in the header to which it is, or is to be, attached. It is through this opening that fluid flows (identified as outflow 20) from the main flow channel 13 within vaned fin 4, into the header.

Figure 8:
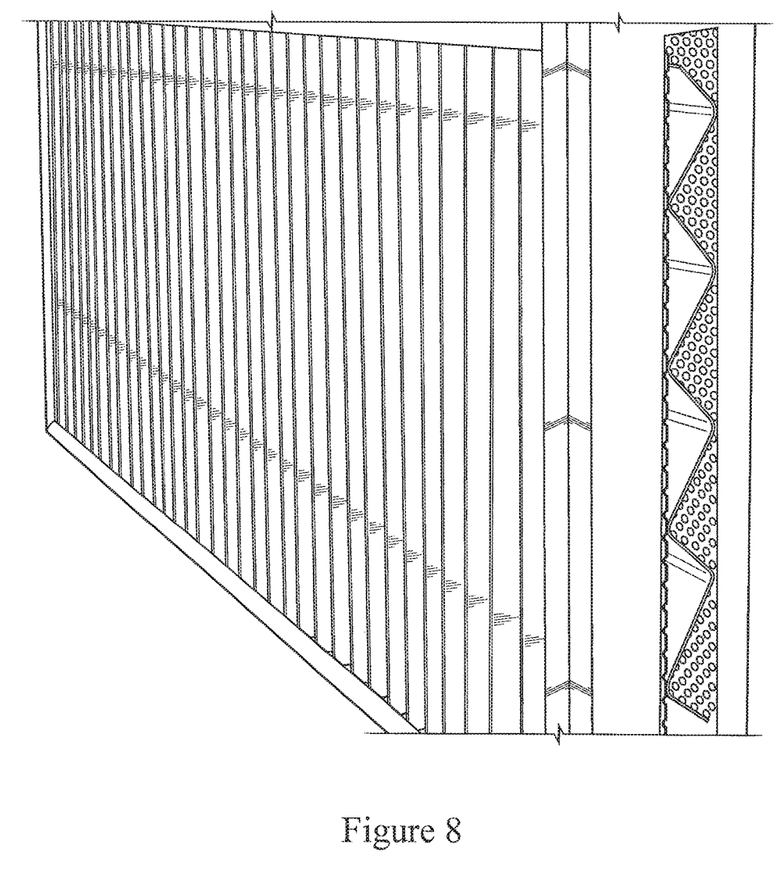
FIG. 8 is a photograph of a vaned fin according to one embodiment of the present invention, in which the fluid permeable screens are formed with layered metal mesh vanes.

FIG. 8 is a photograph of a vaned fin as depicted in FIG. 3(a), and which includes perforated metal vanes.

FIG. 9 shows an exploded view of the vaned filter element according to one embodiment of the present invention, which incorporates layered metal mesh. Using this configuration, filtration of debris smaller than 200 µm is possible. After the initial accumulation of a thin fibre mat, much smaller size debris (nominal size of 10 µm) are filtered. The mesh size can be changed depending on the requirements of the specific application.

The two vaned surfaces on each side of the fin are composed of two layers of woven metal mesh surfaces 24 and 25 as shown in FIG. 9. The outer mesh surface 25 provides the fine-particle filtering capability. This mesh is very flexible on its own and requires structural enhancement for consistent vane forming. The inner mesh surface 24 is selected to increase the stiffness and strength of the layered surface. The combined fine-mesh surface 25 and the course-mesh surface 24 provide fine filtering capability with sufficient structural strength. The two mesh layers are attached prior to forming the vanes at multiple locations such that they behave as one surface. This layered mesh surface is used to manufacture the two faces of the fin with formed hollow vanes. The details of the vanes are shown in FIG. 10. The two vaned surfaces are attached to the flat perforated plate 23. The combined vaned face is structurally strong. The corrugated plate 15 adds significant additional stiffness and strength, and forms flow channels for fluid communication with the collection header. Edges of the vaned fin are covered by a mounting frame 16 around all sides except the edge that fits into the header. This edge includes one or more openings to facilitate fluid communication between the flow channels and the interior of the header. This frame also adds to the structural strength of the fin. The mounting frame 16 can be fully or partially perforated if extra screen area is needed.

The details of the layered metal mesh vane is shown in FIG. 10. As illustrated in this figure, after entering the vanes, water flows through the hollow core 12 of the vanes towards the main flow channel 13 of the fin. With the optimal use of vane spacing, the thin-bed effect is minimized.

Vane Dimensions

The standard vane dimensions are selected based on the typical debris composition expected in nuclear power plants following a LOCA. The spacing between vanes is determined with the consideration of maximizing the filtering surface area without any loss of filtering capability. If the vane spacing is too large, the surface area of the fin will be non-optimal, resulting in a non-compact strainer design. If the vane spacing if too small, deposited debris on the vane surfaces will bridge across the vanes resulting in a reduction in the effective filtering area and, hence, a reduction in filtering efficiency. For this reason, the proper selection of vane spacing is important for optimal design.

It is commonly accepted that the typical thin bed debris thickness is about 3 mm. As an example, if the true thin bed for a particular application were 3 mm, a vane pitch of approximately 14 mm with 10 mm space between two adjacent vanes could be appropriate in order to allow the formation of the thin bed without bridging between vanes. These dimensions can be optimized for different applications by laboratory testing.

The selection of vane height is also determined by consideration of maximizing filtering surface area while maintaining filtering efficiency. Although the fin surface area can be increased indefinitely by increasing filtration area, there is a limit beyond which additional vane height will not provide any benefit for debris filtration. When the debris head loss becomes dominated by the thick-bed head loss, the increased vane height provides no further improvement in filtering capability. This is because the thick-bed debris fills the space between vanes and the thick-bed head loss becomes a function of the projected area (e.g., fin surface area without the vanes) that is independent of the vane height. The standard vane height used for nuclear ECCS strainer applications is roughly 25 mm, but this dimension has to be optimized with lab testing to include the effects of debris composition and debris quantity per unit area.

Increase in Surface Area

Compared to the Flat-Surface Fin and Corrugated Surface Fin of the Finned Strainer technology, the present Vaned Fin invention provides about 4.5 and 2.5 times the surface area per unit volume, respectively. The significant increase in the surface area minimizes the "thin-bed effect" by distributing the thin bed debris deposition over a larger surface area.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A filtering element comprising:
   (a) an elongate perimeter frame having an end surface for mounting to a header, the end surface defining one or more openings,
   (b) a pair of fluid permeable screens fixed to the perimeter frame in opposed spaced relation to one another, and
   (c) at least one fluid flow channel is formed between the pair of fluid permeable screens to provide fluid communication with the header or tube via the one or more openings of the perimeter frame,
   wherein each one of the pair of fluid permeable screens is folded into a plurality of hollow vanes extending outwardly in a direction away from the other of the fluid permeable screens, wherein each one of the hollow vanes defines pairs of opposing, spaced apart permeable surfaces parallel to one another and to the end surface, and wherein each pair of opposing, spaced apart permeable surfaces define a vane width, wherein the vane width is less than a spacing between adjacent vanes.

2. The filtering element of claim 1, wherein each one of the pair of fluid permeable screens are formed from permeable metal sheet, metal mesh or a combination thereof.

3. The filtering element of claim 1, further comprising a corrugated metal spacer disposed between and maintaining each one of the pair of fluid permeable screens in spaced relation, a plurality of flow channels being defined between the corrugated metal spacer and the pair of fluid permeable screens.

4. The filtering element of claim 1, wherein each one of the plurality of hollow vanes has a vane pitch of approximately 14 millimeters and the spacing between adjacent vanes is approximately 10 millimeters.

5. The filtering element of claim 1;
wherein the at least one fluid flow channel is defined by a plate positioned between the pair of fluid permeable screens; and
wherein the plurality of hollow vanes are oriented transversely to the flow channel.

6. The filtering element of claim 5;
wherein the plate is corrugated.

7. A strainer for filtering debris from a fluid comprising:
(a) a header defining an enclosed volume and having an outlet to provide fluid communication with a suction source, the header having a plurality of inlet aperture slots formed therein, and
(b) a plurality of filter elements in fluid communication with the plurality of inlet aperture slots for filtering debris from the fluid, each one of the filter elements comprising a perimeter frame having an end surface for mounting to the header, the end surface defining one or more openings, and a pair of fluid permeable screens fixed thereto in opposed spaced relation, and at least one fluid flow channel therebetween in fluid communication with the enclosed volume through the one or more openings of the frame and the aperture slot,
wherein each one of the pair of fluid permeable screens is folded into a plurality of hollow vanes extending outwardly in a direction away from the other of the fluid permeable screens, wherein each one of the hollow vanes defines pairs of opposing, spaced apart permeable surfaces parallel to one another and to the end surface, and wherein each pair of opposing, spaced apart permeable surfaces define a vane width, wherein the vane width is less than a spacing between adjacent vanes.

8. The strainer of claim 7, wherein the each one of the pair of fluid permeable screens are formed from perforated metal plate.

9. The strainer of claim 8, further comprising a corrugated metal spacer disposed between and maintaining each one of the pair of fluid permeable screens in spaced relation, a plurality of the flow channels being defined between the corrugated metal spacer and the pair of fluid permeable screens.

10. The strainer of claim 7, further comprising a corrugated metal spacer disposed between and maintaining each one of the pair of fluid permeable screens in spaced relation, a plurality of the flow channels being defined between the corrugated metal spacer and the pair of fluid permeable screens.

11. The strainer of claim 7, wherein each one of the plurality of hollow vanes has a vane pitch of approximately 14 millimeters and the spacing between adjacent vanes is approximately 10 millimeters.

12. The strainer of claim 7;
wherein the at least one fluid flow channel is defined by a plate positioned between the pair of fluid permeable screens; and
wherein the plurality of hollow vanes are oriented transversely to the flow channel.

13. The strainer of claim 12;
wherein the plate is corrugated.

14. A filtering element comprising a perimeter frame having one or more openings defined by an end surface of the perimeter frame for mounting to a header, and a pair of fluid permeable screens fixed to the perimeter frame in opposed spaced apart relation to one another defining at least one fluid flow channel to provide fluid communication with a header or tube via the one or more openings in the end surface of the perimeter frame, each one of the screens including a plurality of hollow vanes extending outwardly in a direction away from the other of the fluid permeable screen, pairs of adjacent hollow vanes defining pairs of opposing, spaced apart permeable surfaces parallel to one another and to the end surface, each one of the permeable surfaces effecting fluid communication with a hollow core of the vane to which the surface is respective, and, wherein the vane width is less than a spacing between adjacent vanes.

15. The filtering element as claimed in claim 14, further comprising:
a corrugated metal spacer disposed between and maintaining each one of the pair of fluid permeable screens in spaced relation, a plurality of flow channels being defined between the corrugated metal spacer and the pair of fluid permeable screens.

16. The filtering element as claimed in claim 14;
wherein each one of the one or more fluid permeable screens is formed from permeable metal sheet, metal mesh or a combination thereof.

17. The filtering element as claimed in claim 14;
wherein each one of the one or more fluid permeable screens includes layered mesh.

18. The filtering element as claimed in claim 17, further comprising:
a perforated plate;
wherein the layered mesh is attached to the perforated plate.

19. The filtering element of claim 14;
wherein each one of the plurality of hollow vanes has a vane pitch of approximately 14 millimeters and the spacing between adjacent vanes is approximately 10 millimeters.

20. The filtering element of claim 14;
wherein the at least one fluid flow channel is defined by a plate positioned between the pair of fluid permeable screens; and
wherein the plurality of hollow vanes are oriented transversely to the flow channel.

21. The filtering element of claim 20;
wherein the plate is corrugated.

* * * * *